United States Patent
Kaneko et al.

(10) Patent No.: US 9,581,843 B2
(45) Date of Patent: Feb. 28, 2017

(54) LIQUID CRYSTAL DISPLAY DEVICE AND METHOD FOR DRIVING THE SAME

(71) Applicant: Sharp Kabushiki Kaisha, Osaka-shi, Osaka (JP)

(72) Inventors: Seiji Kaneko, Osaka (JP); Kaoru Yamamoto, Osaka (JP); Yasuyuki Ogawa, Osaka (JP); Kohhei Tanaka, Osaka (JP); Seiichi Uchida, Osaka (JP); Yutaka Takamaru, Osaka (JP); Shigeyasu Mori, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 176 days.

(21) Appl. No.: 14/345,458

(22) PCT Filed: Sep. 20, 2012

(86) PCT No.: PCT/JP2012/073985
§ 371 (c)(1),
(2) Date: Mar. 18, 2014

(87) PCT Pub. No.: WO2013/047300
PCT Pub. Date: Apr. 4, 2013

(65) Prior Publication Data
US 2014/0320479 A1    Oct. 30, 2014

(30) Foreign Application Priority Data

Sep. 27, 2011    (JP) .................................. 2011-210178

(51) Int. Cl.
*G02F 1/133*    (2006.01)
*G09G 3/36*    (2006.01)

(52) U.S. Cl.
CPC ....... *G02F 1/13306* (2013.01); *G09G 3/3648* (2013.01); *G09G 3/3688* (2013.01);
(Continued)

(58) Field of Classification Search
CPC . G09G 2310/04; G09G 3/3648; G09G 3/3688
See application file for complete search history.

(56) References Cited

U.S. PATENT DOCUMENTS 7,333,096 B2 *    2/2008    Washio ................ G09G 3/3648
345/103
2002/0041281 A1    4/2002    Yanagi et al.
(Continued)

FOREIGN PATENT DOCUMENTS

JP    2002-116739 A    4/2002
JP    2002-366108 A    12/2002
(Continued)

OTHER PUBLICATIONS

Official Communication issued in International Patent Application No. PCT/JP2012/073985, mailed on Dec. 25, 2012.

*Primary Examiner* — Afroza Chowdhury
(74) *Attorney, Agent, or Firm* — Keating & Bennett, LLP

(57) ABSTRACT

At the time of partial drive, the levels of voltages applied to data lines SL1 to SLn are switched according to a rewrite frequency set for each region of a display screen. For example, in a still-image display region with a relatively low rewrite frequency, the levels of the voltages applied to the data lines SL1 to SLn are set to be higher than those for a moving-image display region with a relatively high rewrite frequency. By this, the same effect as that obtained when a counter voltage is switched according to the rewrite frequency can be obtained. Thus, flicker occurring in each region of the display screen can be suppressed.

11 Claims, 9 Drawing Sheets

(52) U.S. Cl.
CPC . *G09G 2310/04* (2013.01); *G09G 2320/0285* (2013.01); *G09G 2320/0673* (2013.01); *G09G 2340/0435* (2013.01)

(56) References Cited

U.S. PATENT DOCUMENTS

| | | | |
|---|---|---|---|
| 2002/0186191 A1 | 12/2002 | Ikeda et al. | |
| 2003/0112213 A1* | 6/2003 | Noguchi | G09G 3/3614 345/96 |
| 2003/0122773 A1* | 7/2003 | Washio | G09G 3/3648 345/103 |
| 2004/0196236 A1* | 10/2004 | Kudo | G09G 3/3685 345/89 |
| 2006/0007092 A1 | 1/2006 | Sekiguchi et al. | |
| 2008/0036753 A1* | 2/2008 | Washio | G09G 3/3648 345/212 |
| 2008/0272998 A1 | 11/2008 | Yano et al. | |
| 2011/0037914 A1* | 2/2011 | Noguchi | G09G 3/3614 349/37 |

FOREIGN PATENT DOCUMENTS

| | | |
|---|---|---|
| JP | 2006-003512 A | 1/2006 |
| WO | 2006/009106 A1 | 1/2006 |

* cited by examiner

| REWRITE FREQUENCY | VOLTAGE VALUE |
|---|---|
| 60Hz | Va |
| 5Hz | Vb |

| REWRITE FREQUENCY | OFFSET VALUE |
|---|---|
| fa | 0 |
| fb | OFSb |
| ⋮ | ⋮ |
| fr | OFSr |

| REWRITE FREQUENCY | VOLTAGE VALUE |
|---|---|
| fa | Va |
| fb | Vb |
| ⋮ | ⋮ |
| fr | Vr |

LIQUID CRYSTAL DISPLAY DEVICE AND METHOD FOR DRIVING THE SAME

TECHNICAL FIELD

The present invention relates to a liquid crystal display device and a method for driving the liquid crystal display device. More particularly, the present invention relates to a liquid crystal display device having a partial drive function, and a method for driving the liquid crystal display device.

BACKGROUND ART

Some liquid crystal display devices have a partial drive function that rewrites a specific portion of a display screen at a lower frequency than those for other portions. Partial drive is used, for example, when a moving image is displayed at a central portion of a display screen, and still images are displayed as background images at the top and bottom of the moving-image display region. For example, the moving-image display region is rewritten at a frequency of 60 Hz, and the still-image display region are rewritten at a frequency of 5 Hz. By thus setting a lower rewrite frequency for the still-image display region than normal, the number of times a drive circuit operates is reduced, enabling to reduce the power consumption of the liquid crystal display device.

A liquid crystal display device that performs partial drive is described in, for example, Patent Document 1. Patent Document 1 describes a liquid crystal display device that suppresses flicker having one-half frequency of a frame frequency by changing a counter electrode potential 2k times during one frame period, when k partial display regions where rewriting is performed at a normal frequency are set on a display screen.

PRIOR ART DOCUMENT

Patent Document

[Patent Document 1] Japanese Laid-Open Patent Publication No. 2006-3512

SUMMARY OF THE INVENTION

Problems to be Solved by the Invention

In general, when a liquid crystal display device is used, in order to suppress flicker, the process of adjusting a counter voltage of a liquid crystal panel (voltage applied to a counter electrode) is performed. However, the optimum level of the counter voltage changes according to the rewrite frequency. Hence, in a conventional liquid crystal display device that performs partial drive, when a display screen including a moving-image display region and a still-image display region is displayed, flicker occurs on the display screen due to the difference in the optimum level of the counter voltage between the moving-image display region and the still-image display region.

Therefore, an object of the present invention is to provide a liquid crystal display device that prevents flicker occurring at the time of partial drive.

Means for Solving the Problems

According to a first aspect of the present invention, there is provided a liquid crystal display device having a partial drive function, the liquid crystal display device including: a liquid crystal panel including a plurality of scanning lines, a plurality of data lines, and a plurality of pixel circuits arranged at respective intersections of the scanning lines and the data lines; a scanning line drive circuit that drives the scanning lines; a data line drive circuit that applies voltages according to a data signal, to the data lines; and a display control circuit that controls the scanning line drive circuit and the data line drive circuit, wherein at the time of partial drive, levels of the voltages applied to the data lines are switched according to a rewrite frequency set for each region of a display screen.

According to a second aspect of the present invention, in the first aspect of the present invention, the display control circuit outputs a plurality of reference voltages to the data line drive circuit, the data line drive circuit generates voltages to be applied to the data lines, using the reference voltages as references, and the display control circuit switches levels of the reference voltages according to the rewrite frequency.

According to a third aspect of the present invention, in the second aspect of the present invention, a plurality of voltages or a plurality of sets of voltages are supplied to the display control circuit to generate the reference voltages, and the display control circuit selects one voltage or one set of voltages from among the supplied voltages according to the rewrite frequency, and generates the reference voltages based on the selected voltage(s).

According to a fourth aspect of the present invention, in the second aspect of the present invention, one voltage or one set of voltages is supplied to the display control circuit to generate the reference voltages, and the display control circuit includes a table that stores offset values associated with rewrite frequencies, reads from the table an offset value associated with the rewrite frequency, and generates the reference voltages based on a voltage higher by the read offset value than the supplied voltage(s).

According to a fifth aspect of the present invention, in the second aspect of the present invention, one voltage or one set of voltages is supplied to the display control circuit to generate the reference voltages, and the display control circuit includes a table that stores voltage values associated with rewrite frequencies, reads from the table a voltage value associated with the rewrite frequency, and generates the reference voltages based on a voltage according to the read voltage value.

According to a sixth aspect of the present invention, in the first aspect of the present invention, the display control circuit includes a table that stores offset values associated with rewrite frequencies, reads from the table an offset value associated with the rewrite frequency, and generates an offset voltage according to the read offset value, and the data line drive circuit applies voltages obtained by adding the offset voltage to the voltages according to the data signal, to the data lines.

According to a seventh aspect of the present invention, in the first aspect of the present invention, at the time of partial drive, the lower the rewrite frequency, the higher the levels of the voltages applied to the data lines.

According to an eighth aspect of the present invention, in the first aspect of the present invention, at the time of partial drive, a first region with a relatively high rewrite frequency and a second region with a relatively low rewrite frequency are set on the display screen.

According to a ninth aspect of the present invention, in the first aspect of the present invention, the liquid crystal display device further includes a counter electrode drive circuit that applies a fixed counter voltage to a counter electrode of the liquid crystal panel.

According to a tenth aspect of the present invention, in the first aspect of the present invention, the liquid crystal display device further includes a counter electrode drive circuit that applies a counter voltage to a counter electrode of the liquid crystal panel, the counter voltage changing between two levels every predetermined period of time.

According to an eleventh aspect of the present invention, in the first aspect of the present invention, each of the pixel circuits includes a thin film transistor having a semiconductor layer formed of an oxide semiconductor.

According to a twelfth aspect of the present invention, there is provided a method for driving a liquid crystal display device having a liquid crystal panel including a plurality of scanning lines, a plurality of data lines, and a plurality of pixel circuits arranged at respective intersections of the scanning lines and the data lines, the method including the steps of: driving the scanning lines; and applying voltages according to a data signal, to the data lines, wherein levels of the voltages applied to the data lines are switched according to a rewrite frequency set for each region of a display screen.

Effects of the Invention

According to the first or twelfth aspect of the present invention, by switching the levels of voltages applied to the data lines, according to the rewrite frequency, the same effect as that obtained when a counter voltage is switched according to the rewrite frequency can be obtained. Therefore, when a display screen including regions having different rewrite frequencies is displayed by partial drive, flicker occurring in each region of the display screen can be suppressed.

According to the second aspect of the present invention, the levels of reference voltages are switched according to the rewrite frequency, and voltages to be applied to the data lines are generated using the reference voltages as references. By this, the levels of the voltages applied to the data lines are switched according to the rewrite frequency, enabling to suppress flicker occurring in each region of the display screen.

According to the third aspect of the present invention, one voltage or one set of voltages is selected from among a plurality of voltages or a plurality of sets of voltages according to the rewrite frequency, and reference voltages are generated based on the selected voltage (s). By this, the levels of voltages applied to the data lines are switched according to the rewrite frequency, enabling to suppress flicker occurring in each region of the display screen.

According to the fourth or fifth aspect of the present invention, an offset value or a voltage value is read from the table according to the rewrite frequency, and reference voltages are generated based on the read value. By this, the levels of voltages applied to the data lines are switched according to the rewrite frequency, enabling to suppress flicker occurring in each region of the display screen. In addition, since only one voltage or only one set of voltages is required to generate reference voltages, the circuit configuration of the liquid crystal display device can be simplified.

According to the sixth aspect of the present invention, an offset value is read from the table according to the rewrite frequency, an offset voltage is generated based on the read value, and the offset voltage is added to voltages according to a data signal. By this, the levels of voltages applied to the data lines are switched according to the rewrite frequency, enabling to suppress flicker occurring in each region of the display screen.

According to the seventh aspect of the present invention, in a liquid crystal display device including a liquid crystal panel in which the lower the rewrite frequency the lower the optimum counter voltage, flicker occurring in each region of the display screen can be suppressed.

According to the eighth aspect of the present invention, in a liquid crystal display device that displays, by partial drive, a display screen including two types of regions having different rewrite frequencies, flicker occurring in each region of the display screen can be suppressed.

According to the ninth aspect of the present invention, in a liquid crystal display device that applies a fixed counter voltage to the counter electrode, flicker occurring in each region of the display screen can be suppressed.

According to the tenth aspect of the present invention, in a liquid crystal display device that applies, to the counter electrode, a counter voltage which changes between two levels, flicker occurring in each region of the display screen can be suppressed. In addition, since the levels of voltages applied to the data lines can be switched, the configuration of a circuit that generates a counter voltage can be simplified.

According to the eleventh aspect of the present invention, in a liquid crystal display device having pixel circuits, each of which includes a thin film transistor having a semiconductor layer formed of an oxide semiconductor, flicker occurring in each region of the display screen can be suppressed. In addition, by forming a thin film transistor included in a pixel circuit using an oxide semiconductor, the off-leakage current of the thin film transistor is reduced, by which rewrite frequencies at the time of partial drive are reduced, enabling to further reduce the power consumption of the liquid crystal display device.

BRIEF DESCRIPTION OF THE DRAWINGS

FIG. 9 is a diagram showing another example of the LUT of the liquid crystal display device shown in FIG. 7.

FIG. 10 is a diagram showing still another example of the LUT of the liquid crystal display device shown in FIG. 7.

FIG. 11 is a diagram showing yet another example of the LUT of the liquid crystal display device shown in FIG. 7.

MODES FOR CARRYING OUT THE INVENTION

Figure 1:
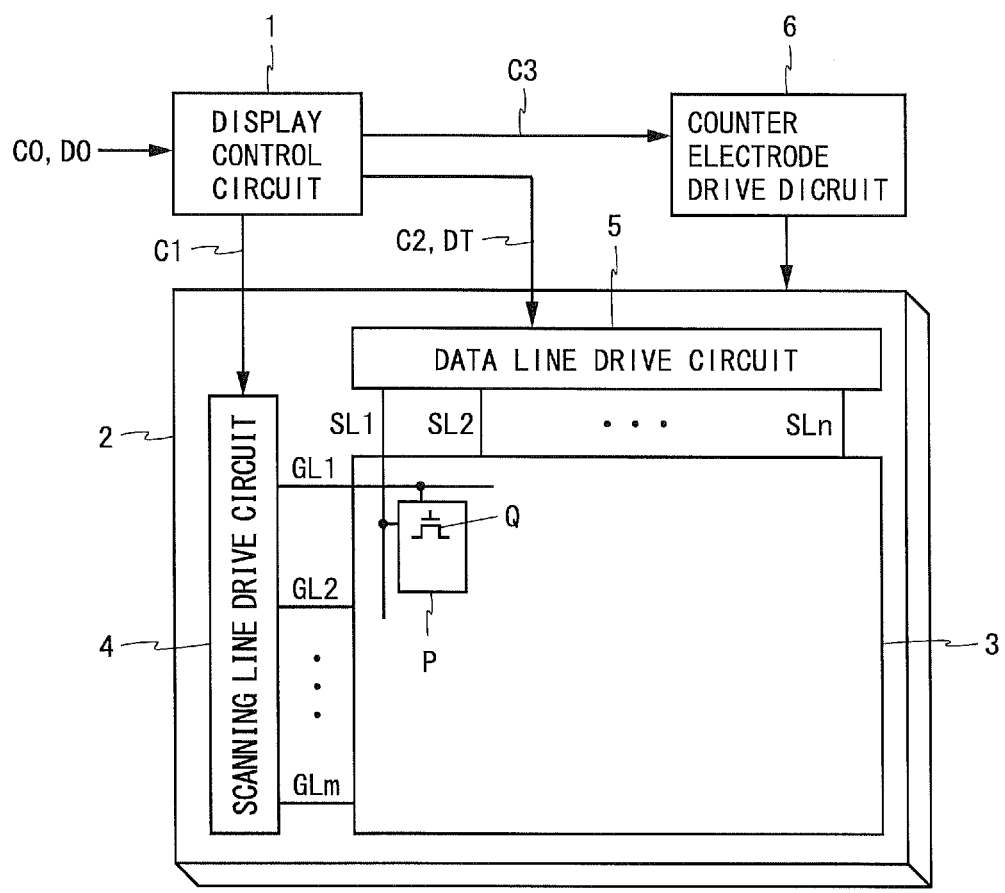
FIG. 1 is a block diagram showing a configuration of a liquid crystal display device according to first to third embodiments of the present invention.

FIG. 1 is a block diagram showing a configuration of a liquid crystal display device according to first to third embodiments of the present invention. The liquid crystal display device shown in FIG. 1 includes a display control circuit 1, a liquid crystal panel 2, and a counter electrode drive circuit 6. In the following, m, n, and x are integers greater than or equal to 2.

The liquid crystal panel 2 has a structure in which a liquid crystal substance is sandwiched between two glass substrates (not shown). On one glass substrate (hereinafter, referred to as the active matrix substrate), m scanning lines GL1 to GLm, n data lines SL1 to SLn, and (m×n) pixel circuits P are formed. The scanning lines GL1 to GLm are arranged parallel to each other, and the data lines SL1 to SLn are arranged parallel to each other so as to intersect with the scanning lines GL1 to GLm perpendicularly. The pixel circuits P are arranged at the respective intersections of the scanning lines GL1 to GLm and the data lines SL1 to SLn. The (m×n) pixel circuits P arranged two-dimensionally form a pixel array 3. Each pixel circuit P is connected to one scanning line and one data line. On the other glass substrate of the liquid crystal panel 2, a counter electrode (not shown) facing all of the pixel circuits P is formed.

Each pixel circuit P includes one or more thin film transistors (hereinafter, referred to as a TFT). A TFT:Q included in the pixel circuit P is formed using, for example, an amorphous silicon TFT. Alternatively, the TFT:Q included in the pixel circuit P may be formed using a TFT having a semiconductor layer formed of an oxide semiconductor such as IGZO (Indium Gallium Zinc Oxide). The TFT formed using an oxide semiconductor is characterized by having very low off-leakage current compared to the amorphous silicon TFT.

The liquid crystal display device shown in FIG. 1 includes, on the liquid crystal panel 2, a scanning line drive circuit 4 and a data line drive circuit 5. The scanning line drive circuit 4 drives the scanning lines GL1 to GLm, and the data line drive circuit 5 drives the data lines SL1 to SLn. The scanning line drive circuit 4 and the data line drive circuit 5 are formed monolithically with the pixel circuits P on the active matrix substrate of the liquid crystal panel 2. Note that all or part of the scanning line drive circuit 4 may be COG (Chip On Glass)-mounted on the liquid crystal panel 2, and all or part of the data line drive circuit 5 may be COG-mounted on the liquid crystal panel 2.

The display control circuit 1 and the counter electrode drive circuit 6 are provided external to the liquid crystal panel 2. The counter electrode drive circuit 6 applies a counter voltage to the counter electrode of the liquid crystal panel 2. The counter voltage may be a fixed voltage or may be a voltage that changes to a high level and a low level every predetermined period of time (e.g., one frame period). In the following, unless otherwise noted, the counter voltage is a fixed voltage.

The display control circuit 1 controls the scanning line drive circuit 4, the data line drive circuit 5, and the counter electrode drive circuit 6. Based on a control signal C0 and a data signal D0 which are inputted from the outside, the display control circuit 1 outputs a control signal C1 to the scanning line drive circuit 4, outputs a control signal C2 and a data signal DT to the data line drive circuit 5, and outputs a control signal C3 to the counter electrode drive circuit 6. The data signal DT may be the same signal as the data signal D0 or may be a signal obtained by performing signal processing on the data signal D0.

The liquid crystal display device shown in FIG. 1 has the case of performing normal drive where the entire display screen is rewritten at the same frequency, and the case of performing partial drive where a specific portion of the display screen is rewritten at a lower frequency than those for other portions. Whether to perform normal drive or partial drive is switched by the control signal C0 inputted from the outside to the liquid crystal display device. In each embodiment shown below, a liquid crystal display device which is a detailed version of the liquid crystal display device shown in FIG. 1 will be described.

First Embodiment

Figure 2:
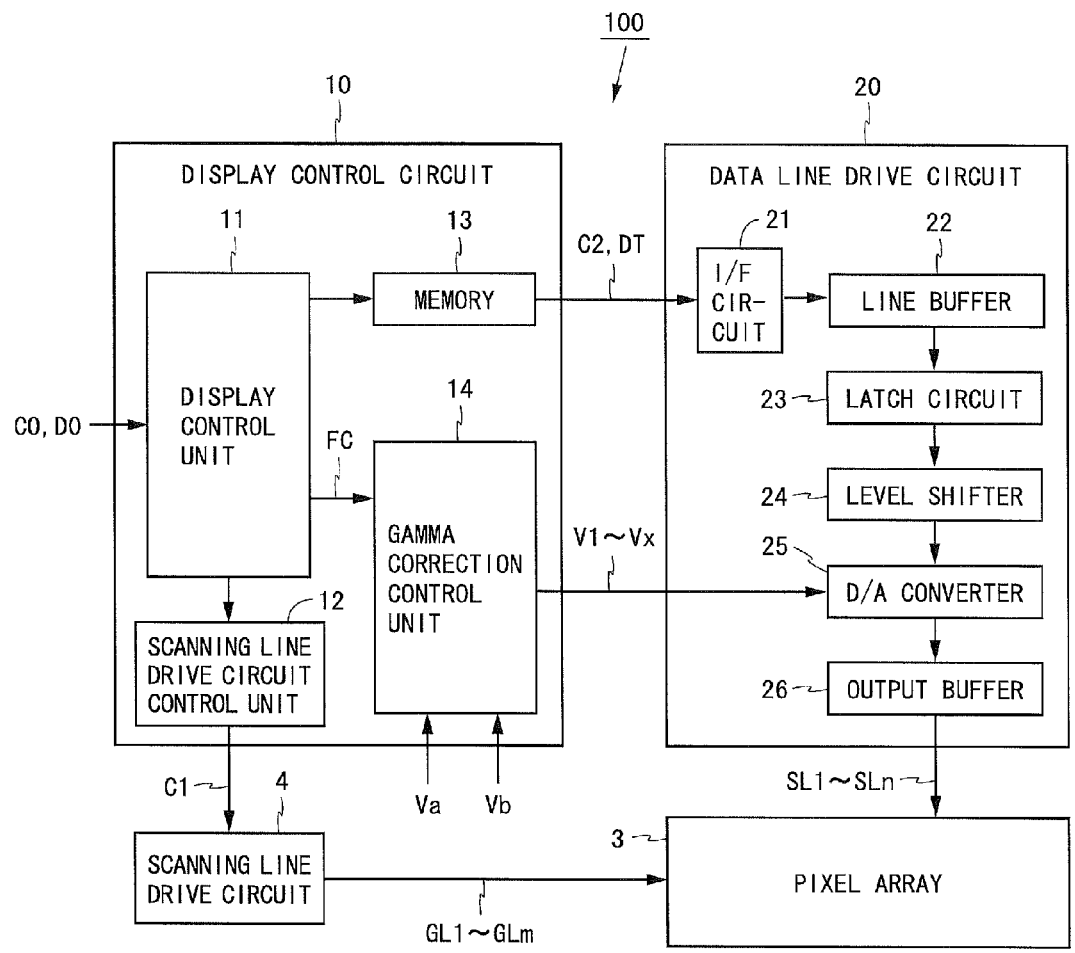
FIG. 2 is a block diagram showing a detail of a liquid crystal display device according to the first embodiment of the present invention.

FIG. 2 is a block diagram showing a detail of a liquid crystal display device according to a first embodiment of the present invention. A liquid crystal display device 100 shown in FIG. 2 has a display control circuit 10 and a data line drive circuit 20 which are detailed versions of the display control circuit 1 and the data line drive circuit 5 of the liquid crystal display device shown in FIG. 1. The display control circuit 10 includes a display control unit 11, a scanning line drive circuit control unit 12, a memory 13, and a gamma correction control unit 14. The data line drive circuit 20 includes an interface circuit 21, a line buffer 22, a latch circuit 23, a level shifter 24, a D/A converter 25, and an output buffer 26. The display control unit 11 receives a control signal C0 and a data signal D0 which are inputted from the outside. The control signal C0 includes a signal indicating whether to perform normal drive or partial drive, and a signal indicating the configuration of a display screen at the time of the partial drive, in addition to a horizontal synchronizing signal and a vertical synchronizing signal. The display control unit 11 writes the received data signal D0 (or a signal obtained by performing signal processing on the data signal D0) into the memory 13, and controls the scanning line drive circuit control unit 12 and the gamma correction control unit 14.

The scanning line drive circuit control unit 12 outputs a control signal C1 to a scanning line drive circuit 4, according to control by the display control unit 11. The control signal C1 includes signals such as a gate start pulse, a gate clock, and a gate enable. The scanning line drive circuit 4 sequentially selects scanning lines GL1 to GLm, according to the control signal C1. The memory 13 stores data signals outputted from the display control unit 11. The data signals stored in the memory 13 are sequentially read and outputted to the data line drive circuit 20 as a data signal DT. The gamma correction control unit 14 outputs x reference voltages V1 to Vx to the data line drive circuit 20. The reference voltages V1 to Vx are used as references for D/A conversion in the D/A converter 25.

A control signal C2 outputted from the display control circuit 10 to the data line drive circuit 20 includes signals such as a source start pulse, a source clock, and a latch enable, etc. The interface circuit 21 receives the control signal C2 and the data signal DT which are outputted from the display control circuit 10, and writes the received data signal DT into the line buffer 22. When the data signal DT for one line is written into the line buffer 22, the latch enable is outputted to the data line drive circuit 20 from the display control circuit 10. When the latch enable is outputted, the latch circuit 23 latches the data signal DT for one line which has been written into the line buffer 22. The level shifter 24 converts output voltages from the latch circuit 23 into levels suitable for D/A conversion. The D/A converter 25 converts outputs from the level shifter 24 into analog signals using, as references, the reference voltages V1 to Vx outputted from the gamma correction control unit 14. The output buffer 26 operates as a voltage follower, and writes, at high speed, outputs from the D/A converter 25 into data lines SL1 to SLn having a large load capacitance. In this manner, the data line drive circuit 20 applies data voltages according to the data signal DT, to the data lines SL1 to SLn.

When the scanning line drive circuit 4 selects an i-th (i is an integer between 1 and m, inclusive) scanning line GLi, n pixel circuits P arranged in the i-th row are selected at once. At this time, the data line drive circuit 205 applies n data voltages to be written into the pixel circuits P in the i-th row, to the data lines SL1 to SLn, respectively. By this, the data voltages are written into the pixel circuits P in the i-th row. The luminance of the pixel circuit P (the luminance of the pixel) included in a pixel array 3 changes according to the difference between the data voltage individually written into the pixel circuit P and a counter voltage common to all pixel circuits P. Therefore, by writing suitable data voltages into all pixel circuits P using the scanning line drive circuit 4 and the data line drive circuit 20, a desired image can be displayed on a liquid crystal panel 2.

Figure 3:
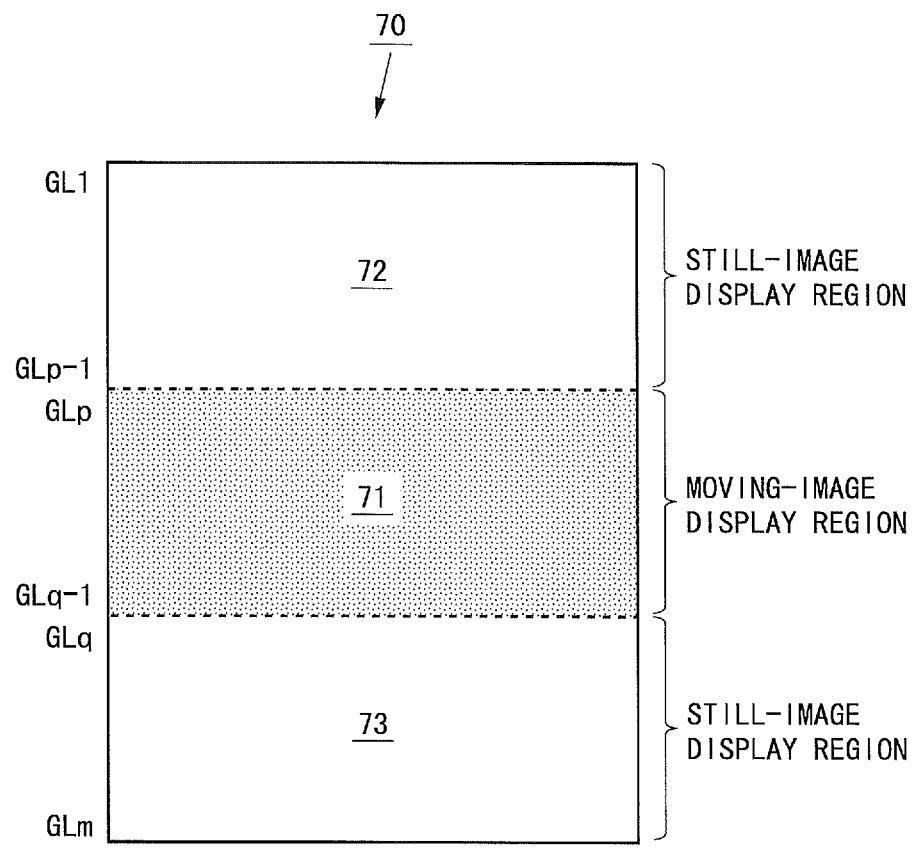
FIG. 3 is a diagram showing an example of a display screen of the liquid crystal display device shown in FIG. 1, at the time of partial drive.

The liquid crystal display device 100 performs either one of normal drive and partial drive. FIG. 3 is a diagram showing an example of a display screen at the time of partial drive. A display screen 70 shown in FIG. 3 includes a moving-image display region 71 and still-image display regions 72 and 73. For example, moving-image content is displayed in the moving-image display region 71, and still-image content such as background images and icons is displayed in the still-image display regions 72 and 73.

In FIG. 3, p and q are integers satisfying 1<p<q<m. In the display screen 70, the first to (p−1)th rows (a portion corresponding to the scanning lines GL1 to GLp−1) serve as the still-image display region 72, the p-th to (q−1)th rows (a portion corresponding to the scanning lines GLp to GLq−1) serve as the moving-image display region 71, and the q-th to m-th rows (a portion corresponding to the scanning lines GLq to GLm) serve as the still-image display region 73. A rewrite frequency (frequency used to rewrite a data voltage to a pixel circuit P) differs between the moving-image display region 71 and the still-image display regions 72 and 73. The rewrite frequency for the moving-image display region 71 is set to be relatively high, and the rewrite frequency for the still-image display regions 72 and 73 is set to be relatively low. In the following, the rewrite frequency for the moving-image display region 71 is set to 60 Hz, and the rewrite frequency for the still-image display regions 72 and 73 is set to 5 Hz.

Figure 4:
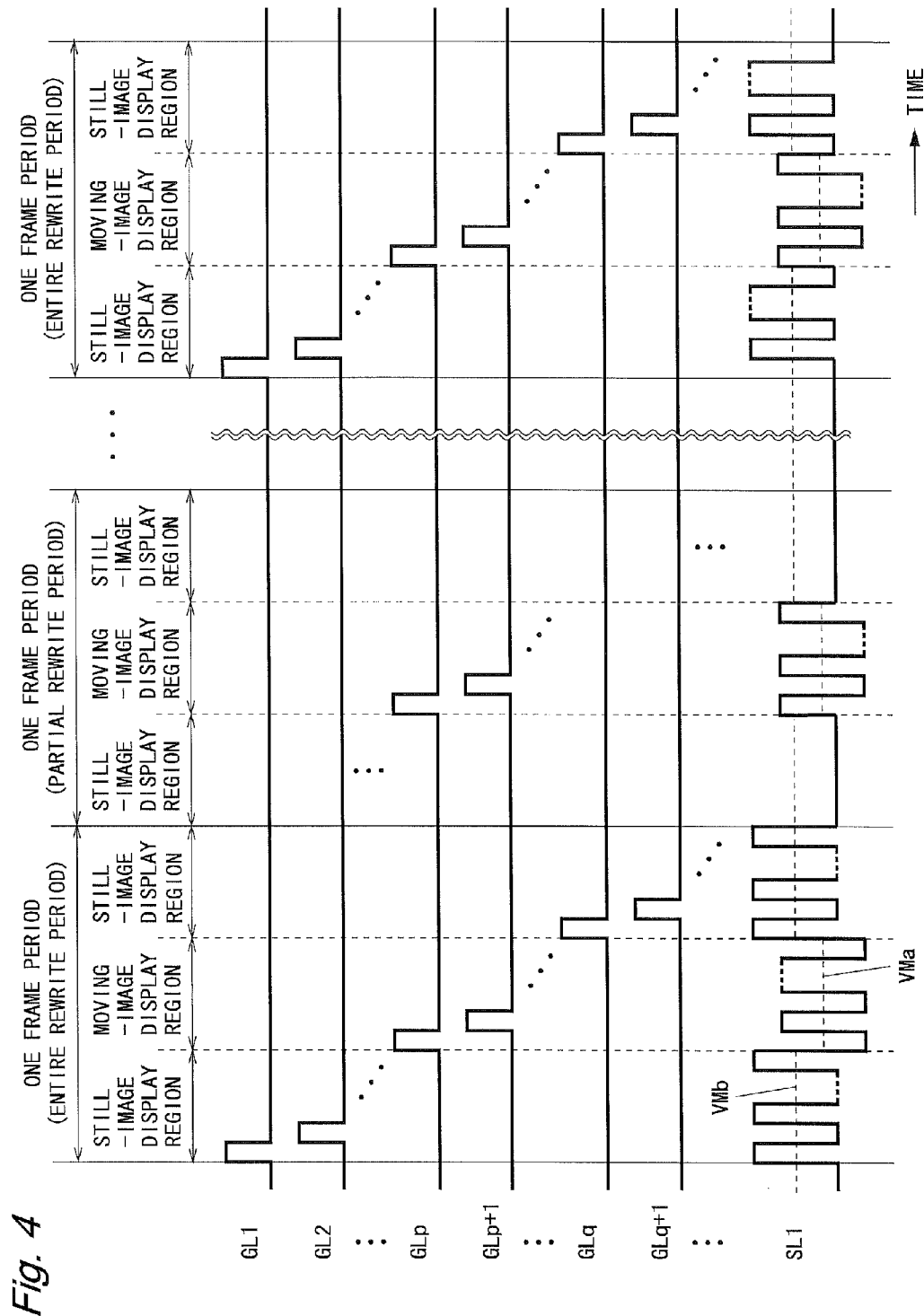
FIG. 4 is a timing chart of the liquid crystal display device shown in FIG. 1, at the time of partial drive.

FIG. 4 is a timing chart showing changes in voltages on scanning lines and a data line at the time of partial drive. FIG. 4 describes changes in voltages on the scanning lines GL1 to GLm and the data line SL1 when the display screen 70 is displayed by partial drive. At the time of partial drive, frame periods are classified into a frame period during which the entire screen is rewritten, and a frame period during which only the moving-image display region is rewritten (hereinafter, the former is referred to as an entire rewrite period and the latter is referred to as a partial rewrite period). In FIG. 4, the first frame period is an entire rewrite period, and the second frame period is a partial rewrite period. When the rewrite frequency for the moving-image display region is 60 Hz and the rewrite frequency for the still-image display region is 5 Hz, 11 partial rewrite periods appear successively during a period from when an entire rewrite period appears until the next entire rewrite period appears.

One frame period is divided into m line periods. During the entire rewrite period, the voltages on the scanning lines GL1 to GLm are sequentially brought to a high level indicating a selected state, every line period. More specifically, during the first line period the voltage on the scanning line GL1 is brought to a high level, and during the second line period the voltage on the scanning line GL2 is brought to a high level. Subsequently, likewise, during the third to m-th line periods, the voltages on the scanning lines GL3 to GLm are brought to a high level, respectively.

During the partial rewrite period, only the voltages on the scanning lines GLp to GLq−1 corresponding to the moving-image display region are sequentially brought to a high level every line period. More specifically, during the p-th line period the voltage on the scanning line GLp is brought to a high level, and during the (p+1)th line period the voltage on the scanning line GLp+1 is brought to a high level. Subsequently, likewise, during the (p+2)th to (q−1)th line periods, the voltages on the scanning lines GLp+2 to GLq−1 are brought to a high level, respectively. The voltages on the scanning lines GL1 to GLp−1 and GLq to GLm corresponding to the still-image display regions remain at a low level during the partial rewrite period.

The liquid crystal display device 100 is characterized in that at the time of partial drive the levels of data voltages applied to the data lines SL1 to SLn are switched according to the rewrite frequency set for each region of the display screen. This characteristic will be described below. As shown in FIG. 2, the display control unit 11 outputs a control signal FC to the gamma correction control unit 14. The control signal FC indicates a rewrite frequency for a region corresponding to a scanning line selected by the scanning line drive circuit 4. The control signal FC may indicate a rewrite frequency by a numerical value. For example, the control signal FC may be 60 indicating 60 Hz for the moving-image display region, and may be 5 indicating 5 Hz for the still-image display region. Alternatively, the control signal FC may indicate one of a plurality of predetermined rewrite frequencies by a number. For example, the control signal FC may be 0 for the moving-image display region, and may be 1 for the still-image display region.

As shown in FIG. 2, two voltages Va and Vb are supplied to the gamma correction control unit 14. The gamma correction control unit 14 selects one of the voltages Va and Vb based on the control signal FC, and generates reference voltages V1 to Vx based on the selected voltage. More specifically, when the control signal FC indicates a rewrite frequency for the moving-image display region, the gamma correction control unit 14 selects the voltage Va, and generates reference voltages V1 to Vx based on the voltage Va. When the control signal FC indicates a rewrite frequency for the still-image display region, the gamma correction control unit 14 selects the voltage Vb, and generates reference voltages V1 to Vx based on the voltage Vb. In the following, the voltage Vb selected for the still-image display region is higher by $\Delta V$ than the voltage Va selected for the moving-image display region. In this case, the reference voltages V1 to Vx for the still-image display region are higher by $\Delta V$ than the reference voltages V1 to Vx for the moving-image display region, respectively.

As described above, the D/A converter 25 converts outputs from the level shifter 24 into analog signals, using the reference voltages V1 to Vx as references. When the reference voltages V1 to Vx are changed, output voltages from the D/A converter 25 change by the same amounts and in the same directions as the reference voltages V1 to Vx. Therefore, data voltages applied to the data lines SL1 to SLn for the still-image display region are higher by ΔV than data voltages applied to the data lines SL1 to SLn for the moving-image display region, respectively.

Figure 5:
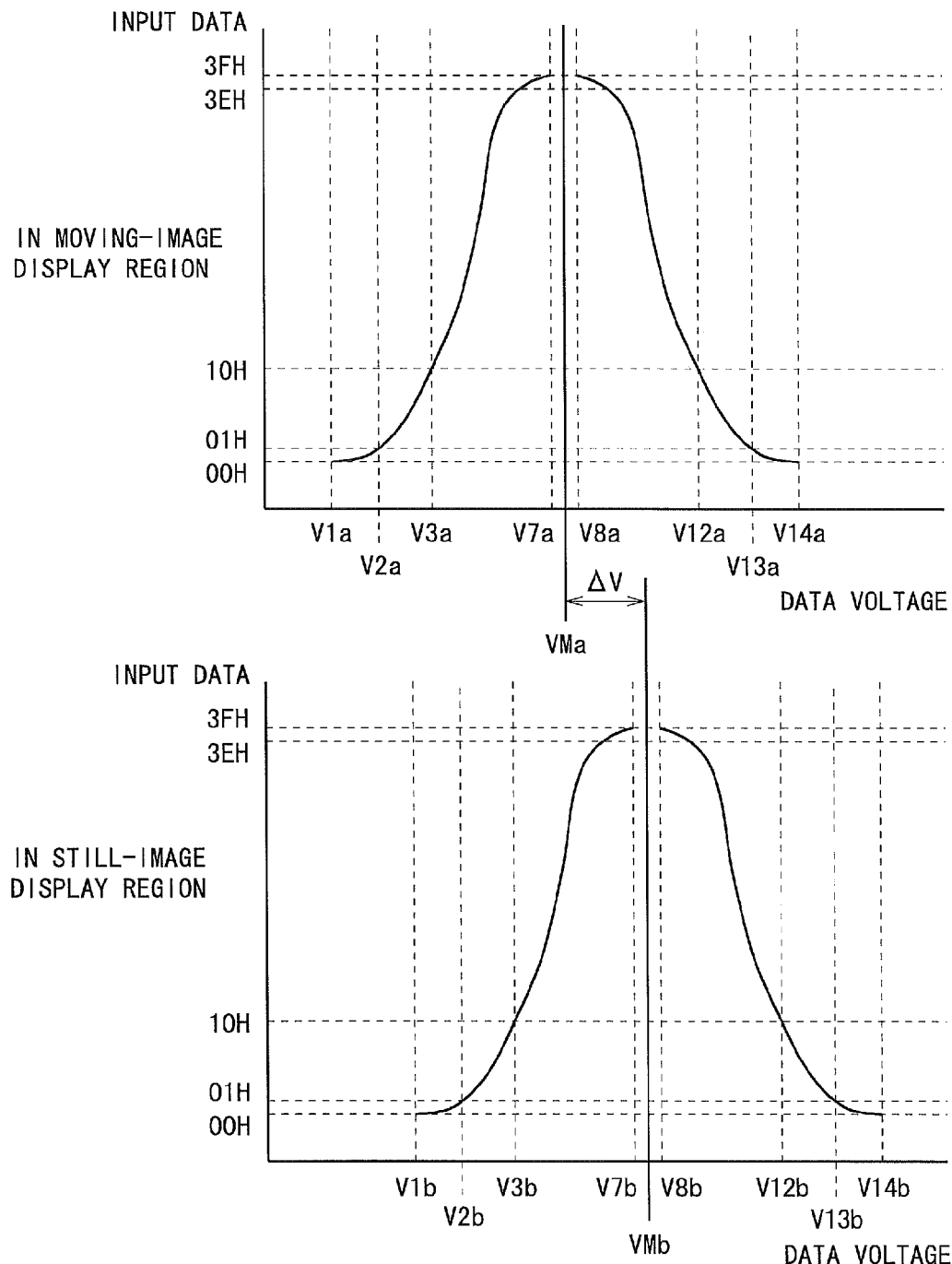
FIG. 5 is a diagram showing data voltages of the liquid crystal display device shown in FIG. 1.

FIG. 5 is a diagram showing data voltages for the moving-image display region and for the still-image display region. For the moving-image display region, when the input data changes in the range of 00H (H indicates a hexadecimal representation) to 3FH, the data voltage changes in the range of V1a to V7a and the range of V8a to V14a. When a voltage just intermediate between the lowest voltage V1a and the highest voltage V14a is VMa, the data voltage changes in a range with the intermediate voltage VMa at the center. For the still-image display region, when the input data changes in the range of 00H to 3FH, the data voltage changes in the range of V1b to V7b and the range of V8b to V14b. When a voltage just intermediate between the lowest voltage V1b and the highest voltage V14b is VMb, the data voltage changes in a range with the intermediate voltage VMb at the center.

As shown in FIG. 4, the voltage on the data line SL1 changes every line period, according to the data signal DT. For the moving-image display region, the voltage on the data line SL1 changes in the range with the intermediate voltage VMa at the center. For the still-image display region, the voltage on the data line SL1 changes in the range with the intermediate voltage VMb at the center. As shown in FIG. 5, the intermediate voltage VMb for the still-image display region is higher by ΔV than the intermediate voltage VMa for the moving-image display region. The voltages on the data lines SL2 to SLn also change in the same manner as the voltage on the data line SL1.

Figure 6:
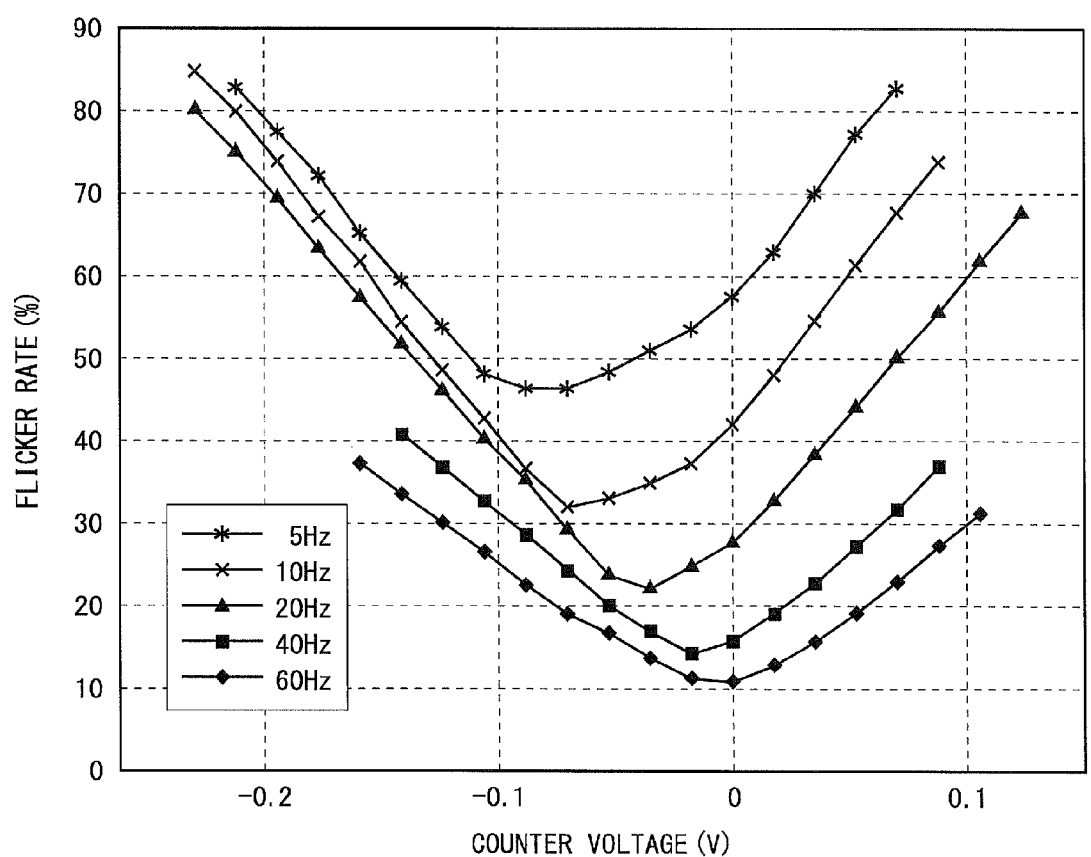
FIG. 6 is a diagram showing an example of the characteristics of a liquid crystal panel.

FIG. 6 is a diagram showing an example of the characteristics of the liquid crystal panel. In FIG. 6, the horizontal axis represents a counter voltage, and the vertical axis represents a flicker rate. FIG. 6 describes changes in the flicker rate when the counter voltage is changed with the rewrite frequency set to 60 Hz, 40 Hz, etc. Note that it is assumed that the counter voltage at which the flicker rate is lowest when the rewrite frequency is 60 Hz is 0 V.

In the liquid crystal display device, the counter voltage at which the flicker rate is lowest is an optimum counter voltage. However, the optimum counter voltage changes according to the rewrite frequency. For example, in FIG. 6, the optimum counter voltage when the rewrite frequency is 5 Hz is lower by about 0.09 V than the optimum counter voltage when the rewrite frequency is 60 Hz. Hence, when a conventional liquid crystal display device that performs partial drive uses an optimum counter voltage for the moving-image display region, since the counter voltage is not optimum for the still-image display region, flicker occurs in the still-image display region.

To solve this problem, the liquid crystal display device 100 according to the present embodiment switches the levels of reference voltages V1 to Vx outputted from the gamma correction control unit 14, according to whether the display region is a moving-image display region or a still-image display region (i.e., according to the rewrite frequency set for each region of the display screen), and thereby switches the levels of data voltages applied to the data lines SL1 to SLn, according to whether the display region is a moving-image display region or a still-image display region. The data voltages for the still-image display region are higher by ΔV than the data voltages for the moving-image display region. The luminance of each pixel circuit P changes according to the difference between the data voltage and the counter voltage. By this, the same effect as that obtained when the counter voltage for the still-image display region is set to be lower by ΔV than the counter voltage for the moving-image display region can be obtained.

For example, in the liquid crystal display device including the liquid crystal panel having the characteristics shown in FIG. 6, by setting the voltage Vb to be higher by about 0.09 V than the voltage Va, the data voltages for the still-image display region become higher by about 0.09 V than the data voltages for the moving-image display region. By this, the same effect as that obtained when the counter voltage for the still-image display region is set to be lower by about 0.09 V than the counter voltage for the moving-image display region can be obtained.

Therefore, by setting two voltages Va and Vb provided to the gamma correction control unit 14 to their suitable levels, when a display screen including a moving-image display region and a still-image display region is displayed by partial drive, not only flicker occurring in the moving-image display region, but also flicker occurring in the still-image display region can be suppressed.

As described above, in the liquid crystal display device 100 according to the present embodiment, the display control circuit 10 selects one voltage from among a plurality of supplied voltages according to the rewrite frequency, and generates reference voltages V1 to Vx based on the selected voltage, and thereby switches the levels of the reference voltages V1 to Vx according to the rewrite frequency. In addition, the data line drive circuit 20 generates voltages to be applied to the data lines SL1 to SLn, using the reference voltages V1 to Vx as references. Hence, at the time of partial drive, the levels of voltages applied to the data lines SL1 to SLn are switched according to the rewrite frequency.

Therefore, according to the liquid crystal display device 100 according to the present embodiment, by switching the levels of voltages applied to the data lines SL1 to SLn, according to the rewrite frequency, the same effect as that obtained when the counter voltage is switched according to the rewrite frequency can be obtained. Hence, when a display screen including regions having different rewrite frequencies is displayed by partial drive, flicker occurring in each region of the display screen can be suppressed. In particular, when a liquid crystal panel in which the lower the rewrite frequency the lower the optimum counter voltage is used, the levels of voltages applied to the data lines SL1 to SLn are increased as the rewrite frequency decreases, by which flicker occurring in each region of a display screen can be suppressed.

In addition, by forming a TFT:Q included in a pixel circuit P using an oxide semiconductor such as IGZO, the off-leakage current of the TFT:Q is reduced, by which rewrite frequencies at the time of partial drive are reduced, enabling to further reduce the power consumption of the liquid crystal display device 100.

Note that in the above description a plurality of voltages are supplied to the display control circuit 10 to generate reference voltages V1 to Vx, and the display control circuit 10 selects one voltage from among the plurality of supplied voltages and generates reference voltages V1 to Vx based on the selected voltage. Instead of this, a plurality of sets of voltages may be supplied to the display control circuit 10 to generate reference voltages V1 to Vx, and the display control circuit 10 may select one set of voltages from among the plurality of sets of supplied voltages and generate reference voltages V1 to Vx based on the selected set of voltages. For example, when one set of voltages includes a high-side voltage and a low-side voltage, by providing the high-side voltage and the low-side voltage to both ends of a ladder resistor, reference voltages V1 to Vx can be generated.

Second Embodiment

Figures 7, 8:
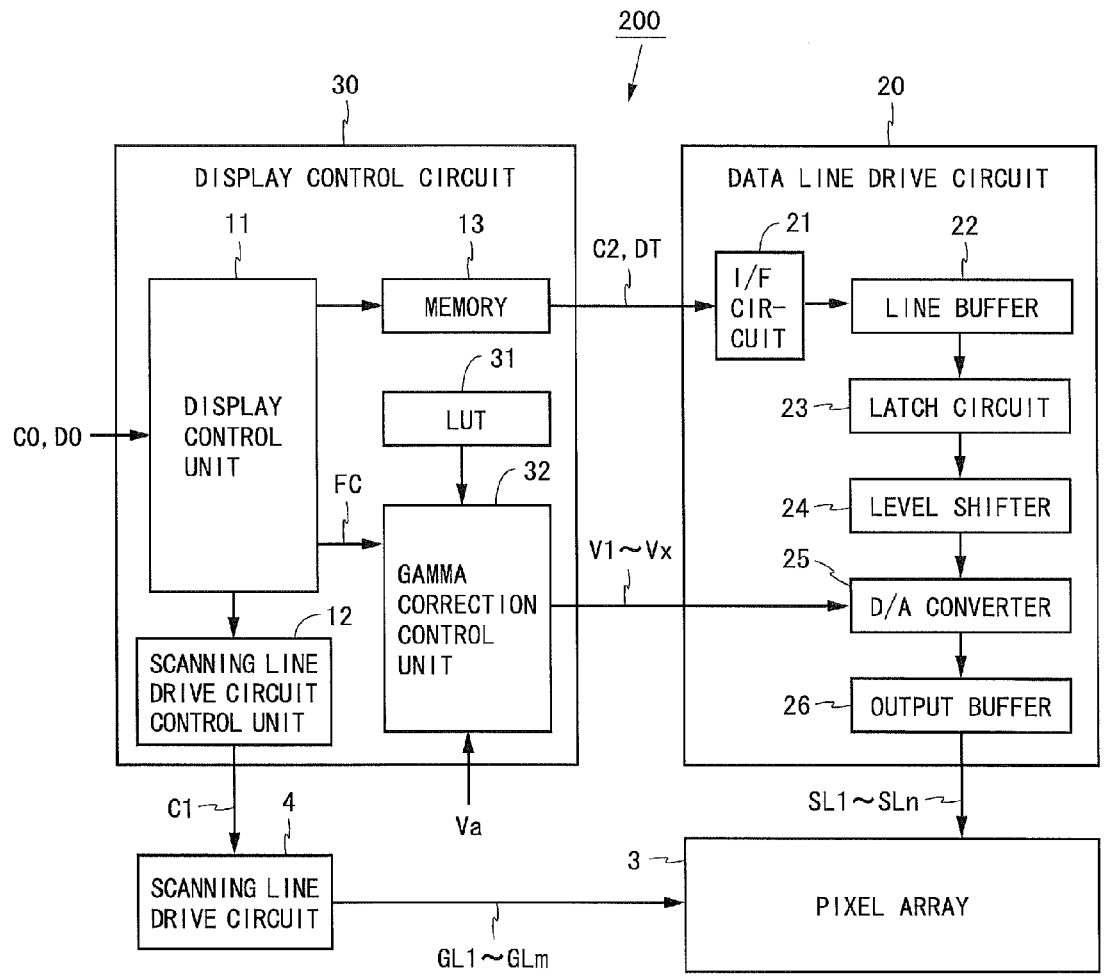
FIG. 7 is a block diagram showing a detail of a liquid crystal display device according to the second embodiment of the present invention.
FIG. 8 is a diagram showing an example of a LUT of the liquid crystal display device shown in FIG. 7.

FIG. 7 is a block diagram showing a detail of a liquid crystal display device according to a second embodiment of the present invention. A liquid crystal display device 200 shown in FIG. 7 has a display control circuit 30 and a data line drive circuit 20 which are detailed versions of the display control circuit 1 and the data line drive circuit 5 of the liquid crystal display device shown in FIG. 1. The display control circuit 30 includes a display control unit 11, a scanning line drive circuit control unit 12, a memory 13, a look up table (hereinafter, referred to as the LUT) 31, and a gamma correction control unit 32. Of the components of the present embodiment, the same components as those of the first embodiment are denoted by the same reference characters and description thereof is omitted.

FIG. 8 is a diagram showing an example of the LUT 31. As shown in FIG. 8, the LUT 31 stores offset values for a voltage used to generate reference voltages V1 to Vx, in association with rewrite frequencies. More specifically, the LUT 31 stores 0 as the offset value when the rewrite frequency is 60 Hz, and stores ΔV as the offset value when the rewrite frequency is 5 Hz.

As shown in FIG. 7, one voltage Va is supplied to the gamma correction control unit 32. The display control unit 11 outputs a control signal FC to the gamma correction control unit 32. The gamma correction control unit 32 reads from the LUT 31 an offset value associated with a rewrite frequency specified by the control signal FC, and generates reference voltages V1 to Vx based on a voltage higher by the read offset value than the voltage Va. More specifically, when the control signal FC indicates a rewrite frequency for a moving-image display region, the gamma correction control unit 32 reads the offset value 0 from the LUT 31, and generates reference voltages V1 to Vx based on the voltage Va. When the control signal FC indicates a rewrite frequency for a still-image display region, the gamma correction control unit 32 reads the offset value ΔV from the LUT 31, and generates reference voltages V1 to Vx based on a voltage (Va+ΔV).

As with the liquid crystal display device 100 according to the first embodiment, the liquid crystal display device 200 according to the present embodiment switches the levels of reference voltages V1 to Vx outputted from the gamma correction control unit 32, according to whether the display region is a moving-image display region or a still-image display region (i.e., according to the rewrite frequency set for each region of a display screen), and thereby switches the levels of data voltages applied to data lines SL1 to SLn, according to whether the display region is a moving-image display region or a still-image display region. The data voltages for the still-image display region are higher by ΔV than the data voltages for the moving-image display region. By this, the same effect as that obtained when the counter voltage for the still-image display region is set to be lower by ΔV than the counter voltage for the moving-image display region can be obtained.

Therefore, by suitably determining offset values stored in the LUT 31, when a display screen including a moving-image display region and a still-image display region is displayed by partial drive, not only flicker occurring in the moving-image display region, but also flicker occurring in the still-image display region can be suppressed.

Note that the liquid crystal display device 200 may include a LUT 33 shown in FIG. 9, instead of the LUT 31. The LUT 33 shown in FIG. 9 stores voltage values used to generate reference voltages V1 to Vx, in association with rewrite frequencies. More specifically, the LUT 33 stores Va as the voltage value when the rewrite frequency is 60 Hz, and stores Vb as the voltage value when the rewrite frequency is 5 Hz. In this case, the gamma correction control unit 32 reads from the LUT 33 a voltage value associated with a rewrite frequency specified by a control signal FC, and generates reference voltages V1 to Vx based on a voltage according to the read voltage value. More specifically, when the control signal FC indicates a rewrite frequency for a moving-image display region, the gamma correction control unit 32 reads the voltage value Va from the LUT 33, and generates reference voltages V1 to Vx based on a voltage Va. When the control signal FC indicates a rewrite frequency for a still-image display region, the gamma correction control unit 32 reads the offset value Vb from the LUT 33, and generates reference voltages V1 to Vx based on a voltage Vb.

In addition, the liquid crystal display device 200 may include LUTs shown in FIGS. 10 and 11, instead of the LUT 31 in order to switch the rewrite frequency to three or more levels. A LUT 34 shown in FIG. 10 stores offset values for a voltage used to generate reference voltages V1 to Vx, in association with r (r is an integer greater than or equal to 3) rewrite frequencies. In the LUT 34, the rewrite frequency for the moving-image display region is fa, and the offset value associated with the rewrite frequency fa is 0. A LUT 35 shown in FIG. 11 stores voltage values used to generate reference voltages V1 to Vx, in association with r rewrite frequencies. By using the LUT 34 or the LUT 35, even when the rewrite frequency is switched to three or more levels, flicker occurring in each region of a display screen can be suppressed.

Liquid crystal display devices that switch the rewrite frequency to three or more levels include, for example, a liquid crystal display device having, in a display screen, a moving-image display region, a still-image display region, and a display region having a rewrite frequency between those of the two display regions, and a liquid crystal display device that sets a lower rewrite frequency for a still-image display region in low power consumption mode than that in normal mode.

As described above, in the liquid crystal display device 200 according to the present embodiment, one voltage Va is supplied to the display control circuit 30 to generate reference voltages V1 to Vx. The display control circuit 30 includes the LUT 31 (or the LUT 34) that stores offset values in association with rewrite frequencies. The display control circuit 30 reads from the LUT an offset value associated with a rewrite frequency, and generates reference voltages V1 to Vx based on a voltage higher by the read offset value than the supplied voltage Va. Alternatively, the display control circuit 30 includes the LUT 33 (or the LUT 35) that stores voltage values in association with rewrite frequencies. The display control circuit 30 reads from the LUT a voltage value associated with a rewrite frequency, and generates reference voltages V1 to Vx based on a voltage according to the read voltage value.

Therefore, according to the liquid crystal display device 200 according to the present embodiment, as with the liquid crystal display device 100 according to the first embodiment, the levels of voltages applied to the data lines SL1 to SLn are switched according to the rewrite frequency, by which flicker occurring in each region of a display screen can be suppressed. In addition, since only one voltage is required to generate reference voltages V1 to Vx, the circuit configuration of the liquid crystal display device 200 can be simplified.

Note that in the above description one voltage is supplied to the display control circuit 30 to generate reference voltages V1 to Vx, and the display control circuit 30 generates reference voltages V1 to Vx based on a voltage higher by an offset value than the supplied voltage. Instead of this, one set of voltages may be supplied to the display control circuit 30 to generate reference voltages V1 to Vx, and the display control circuit 30 may generate reference voltages V1 to Vx based on one set of voltages higher by an offset value than the set of supplied voltages.

Third Embodiment

Figure 12:
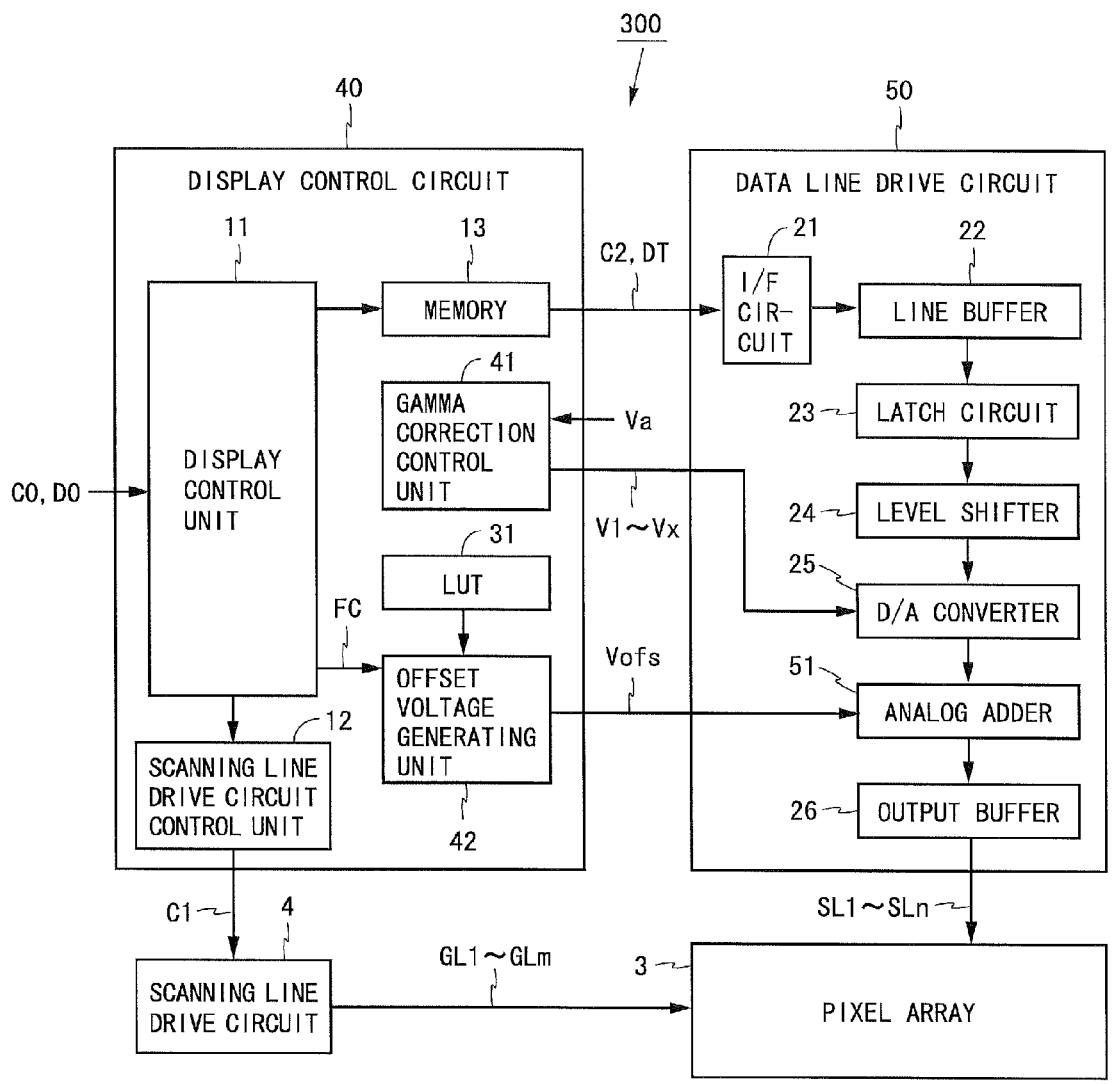
FIG. 12 is a block diagram showing a detail of a liquid crystal display device according to the third embodiment of the present invention.

FIG. 12 is a block diagram showing a detail of a liquid crystal display device according to a third embodiment of the present invention. A liquid crystal display device 300 shown in FIG. 12 has a display control circuit 40 and a data line drive circuit 50 which are detailed versions of the display control circuit 1 and the data line drive circuit 5 of the liquid crystal display device shown in FIG. 1. The display control circuit 40 includes a display control unit 11, a scanning line drive circuit control unit 12, a memory 13, a LUT 31, a gamma correction control unit 41, and an offset voltage generating unit 42. The data line drive circuit 50 is such that an analog adder 51 is added to the data line drive circuit 20 according to the first embodiment. Of the components of the present embodiment, the same components as those of the first and second embodiments are denoted by the same reference characters and description thereof is omitted.

As shown in FIG. 12, one voltage Va is supplied to the gamma correction control unit 41. The gamma correction control unit 41 generates fixed reference voltages V1 to Vx based on the voltage Va. The display control unit 11 outputs a control signal FC to the offset voltage generating unit 42. The offset voltage generating unit 42 reads from the LUT 31 an offset value associated with a rewrite frequency specified by the control signal FC, and generates an offset voltage Vofs according to the read offset value. More specifically, when the control signal FC indicates a rewrite frequency for a moving-image display region, the offset voltage generating unit 42 reads the offset value 0 from the LUT 31 and generates an offset voltage of 0 V. When the control signal FC indicates a rewrite frequency for a still-image display region, the offset voltage generating unit 42 reads the offset value $\Delta V$ from the LUT 31 and generates an offset voltage Vofs. The offset voltage Vofs generated by the offset voltage generating unit 42 is outputted to the data line drive circuit 50, together with the reference voltages V1 to Vx.

The analog adder 51 is provided between a D/A converter 25 and an output buffer 26. Analog signals outputted from the D/A converter 25 and the offset voltage Vofs generated by the offset voltage generating unit 42 are inputted to the analog adder 51. The analog adder 51 adds the offset voltage Vofs to the voltages of the analog signals outputted from the D/A converter 25. The output buffer 26 operates as a voltage follower, and writes, at high speed, outputs from the analog adder 51 into data lines SL1 to SLn having a large load capacitance.

The liquid crystal display device 300 according to the present embodiment switches the level of an offset voltage Vofs generated by the offset voltage generating unit 42, according to whether the display region is a moving-image display region or a still-image display region (i.e., according to the rewrite frequency set for each region of a display screen), and thereby switches the levels of data voltages applied to the data lines SL1 to SLn, according to whether the display region is a moving-image display region or a still-image display region. The data voltages for the still-image display region are higher by $\Delta V$ than the data voltages for the moving-image display region. By this, the same effect as that obtained when the counter voltage for the still-image display region is set to be lower by $\Delta V$ than the counter voltage for the moving-image display region can be obtained.

Therefore, by suitably determining offset values stored in the LUT 31, when a display screen including a moving-image display region and a still-image display region is displayed by partial drive, not only flicker occurring in the moving-image display region, but also flicker occurring in the still-image display region can be suppressed.

Note that although in the liquid crystal display device 300 shown in FIG. 12 the analog adder 51 is provided between the D/A converter 25 and the output buffer 26, the analog adder 51 may be provided within the D/A converter 25 or within the output buffer 26.

As described above, in the liquid crystal display device 300 according to the present embodiment, the display control circuit 40 includes the LUT 31 that stores offset values in association with rewrite frequencies, reads from the LUT 31 an offset value associated with a rewrite frequency, and generates an offset voltage Vofs according to the read offset value. The data line drive circuit 50 applies voltages obtained by adding the offset voltage Vofs to voltages according to a data signal DT, to the data lines SL1 to SLn.

Therefore, according to the liquid crystal display device 300 according to the present embodiment, as with the liquid crystal display devices 100 and 200 according to the first and second embodiments, the levels of voltages applied to the data lines SL1 to SLn are switched according to the rewrite frequency, by which flicker occurring in each region of a display screen can be suppressed.

With regard to the liquid crystal display devices according to the first to third embodiments of the present invention, following modification examples may be configured. In the above-described liquid crystal display devices, the counter electrode drive circuit 6 applies a fixed counter voltage. Instead of this, the counter electrode drive circuit 6 may change the counter voltage to a high level and a low level every predetermined period of time (e.g., one frame period). In general, a liquid crystal display device that changes the counter voltage every predetermined period of time requires a counter voltage generating circuit that generates two counter voltages. When the present invention is applied to such a liquid crystal display device, since the levels of voltages applied to data lines SL1 to SLn can be switched using a display control circuit and a data line drive circuit, the configuration of the counter voltage generating circuit can be simplified.

In addition, although in the above-described liquid crystal display devices, as an example, the rewrite frequency for the moving-image display region is 60 Hz and the rewrite frequency for the still-image display region is 5 Hz, the two rewrite frequencies may be any frequency. In addition, the configuration of a display screen at the time of partial drive may be any configuration. For example, the number of moving-image display regions and still-image display regions may be any number greater than or equal to 1, and the positions of a moving-image display region and a still-image display region in a display screen may be any position.

INDUSTRIAL APPLICABILITY

Liquid crystal display devices of the present invention are characterized by being able to prevent flicker occurring at the time of partial drive, and thus, can be used in display units of various types of electronic devices such as mobile phones and portable-type information devices.

DESCRIPTION OF REFERENCE CHARACTERS 1, 10, 30, and 40: DISPLAY CONTROL CIRCUIT
2: LIQUID CRYSTAL PANEL
3: PIXEL ARRAY
4: SCANNING LINE DRIVE CIRCUIT
5, 20, and 50: DATA LINE DRIVE CIRCUIT
6: COUNTER ELECTRODE DRIVE CIRCUIT
11: DISPLAY CONTROL UNIT
12: SCANNING LINE DRIVE CIRCUIT CONTROL UNIT
13: MEMORY
14, 32, and 41: GAMMA CORRECTION CONTROL UNIT
21: INTERFACE CIRCUIT
22: LINE BUFFER
23: LATCH CIRCUIT
24: LEVEL SHIFTER
25: D/A CONVERTER
26: OUTPUT BUFFER
31 and 33 to 35: LUT
42: OFFSET VOLTAGE GENERATING UNIT
51: ANALOG ADDER
70: DISPLAY SCREEN
71: MOVING-IMAGE DISPLAY REGION
72 and 73: STILL-IMAGE DISPLAY REGION
100, 200, and 300: LIQUID CRYSTAL DISPLAY DEVICE

The invention claimed is:

1. A liquid crystal display device having a partial drive function, the liquid crystal display device comprising:
a liquid crystal panel including a plurality of scanning lines, a plurality of data lines, and a plurality of pixel circuits arranged at respective intersections of the scanning lines and the data lines;
a scanning line drive circuit that drives the scanning lines;
a data line drive circuit that applies voltages according to a data signal, which is input into the data line drive circuit, to the data lines; and
a display control circuit that controls the scanning line drive circuit and the data line drive circuit, wherein
during the partial drive function and at a constant voltage level of the data signal, levels of the voltages applied to the data lines for the constant voltage level of the data signal are switched according to a rewrite frequency set for each region of a display screen and are set such that, the lower the rewrite frequency, the higher the levels of the voltages for the constant voltage level of the data signal.

2. The liquid crystal display device according to claim 1, wherein
the display control circuit outputs a plurality of reference voltages to the data line drive circuit,
the data line drive circuit generates voltages to be applied to the data lines, using the reference voltages as references, and
the display control circuit switches levels of the reference voltages according to the rewrite frequency.

3. The liquid crystal display device according to claim 2, wherein
a plurality of voltages or a plurality of sets of voltages are supplied to the display control circuit to generate the reference voltages, and
the display control circuit selects one voltage or one set of voltages from among the supplied voltages according to the rewrite frequency, and generates the reference voltages based on the selected voltage(s).

4. The liquid crystal display device according to claim 2, wherein
one voltage or one set of voltages is supplied to the display control circuit to generate the reference voltages, and
the display control circuit includes a table that stores offset values associated with rewrite frequencies, reads from the table an offset value associated with the rewrite frequency, and generates the reference voltages based on a voltage higher by the read offset value than the supplied voltage(s).

5. The liquid crystal display device according to claim 2, wherein
one voltage or one set of voltages is supplied to the display control circuit to generate the reference voltages, and
the display control circuit includes a table that stores voltage values associated with rewrite frequencies, reads from the table a voltage value associated with the rewrite frequency, and generates the reference voltages based on a voltage according to the read voltage value.

6. The liquid crystal display device according to claim 1, wherein
the display control circuit includes a table that stores offset values associated with rewrite frequencies, reads from the table an offset value associated with the rewrite frequency, and generates an offset voltage according to the read offset value, and
the data line drive circuit applies voltages obtained by adding the offset voltage to the voltages according to the data signal, to the data lines.

7. The liquid crystal display device according to claim 1, wherein
at the time of partial drive, a first region with a relatively high rewrite frequency and a second region with a relatively low rewrite frequency are set on the display screen.

8. The liquid crystal display device according to claim 1, further comprising a counter electrode drive circuit that applies a fixed counter voltage to a counter electrode of the liquid crystal panel.

9. The liquid crystal display device according to claim 1, further comprising a counter electrode drive circuit that applies a counter voltage to a counter electrode of the liquid crystal panel, the counter voltage changing between two levels every predetermined period of time.

10. The liquid crystal display device according to claim 1, wherein
each of the pixel circuits includes a thin film transistor having a semiconductor layer formed of an oxide semiconductor.

11. A method for driving a liquid crystal display device having a liquid crystal panel including a plurality of scanning lines, a plurality of data lines, and a plurality of pixel circuits arranged at respective intersections of the scanning lines and the data lines, the method comprising the steps of:
  driving the scanning lines; and
  applying voltages according to a data signal, which is input into the data line drive circuit, to the data lines, wherein
  at a constant voltage level of the data signal, levels of the voltages applied to the data lines for the constant voltage level of the data signal are switched according to a rewrite frequency set for each region of a display screen and are set such that, the lower the rewrite frequency, the higher the levels of the voltages for the constant voltage level of the data signal.

* * * * *